United States Patent [19]

Dunlap et al.

[11] Patent Number: 5,787,140
[45] Date of Patent: Jul. 28, 1998

[54] HANDLE ASSEMBLY AND CHANNEL FOR A NUCLEAR REACTOR FUEL BUNDLE ASSEMBLY

[75] Inventors: Thomas G. Dunlap; Gerald M. Latter; Mark J. Colby; Michael R. Stepp. all of Wilmington, N.C.

[73] Assignee: General Electric Company, Schenectady, N.Y.

[21] Appl. No.: 654,957

[22] Filed: May 29, 1996

[51] Int. Cl.[6] ............................................. G21C 3/32
[52] U.S. Cl. ........................... 376/313; 376/434; 376/444
[58] Field of Search ................................... 376/313, 434, 376/444, 446, 448

[56] References Cited

U.S. PATENT DOCUMENTS 4,749,543  6/1988  Crowther et al. ..................... 376/444

Primary Examiner—Daniel D. Wasil
Attorney, Agent, or Firm—Nixon & Vanderhye P.C.

[57] ABSTRACT

A fuel bundle assembly for a nuclear reactor includes a modified channel that improves pressure drop performance and a handle assembly that includes structure for preventing a broken end plug from escaping the fuel bundle. In modifying the channel, one approach is to vary the outside dimension of the fuel channel along the length of the channel, but maintain a constant channel wall thickness. Another approach is to maintain the external dimensions of the fuel channel and vary the wall thickness along the length of the channel. The handle assembly replaces the conventional upper tie plate and is provided with structure for preventing debris such as a broken fuel rod end plug from escaping the fuel bundle. The structure preferably includes a plurality of gridwork cross members forming a substantially square grid including gridwork windows that are sized smaller than the fuel rod end plugs.

15 Claims, 5 Drawing Sheets

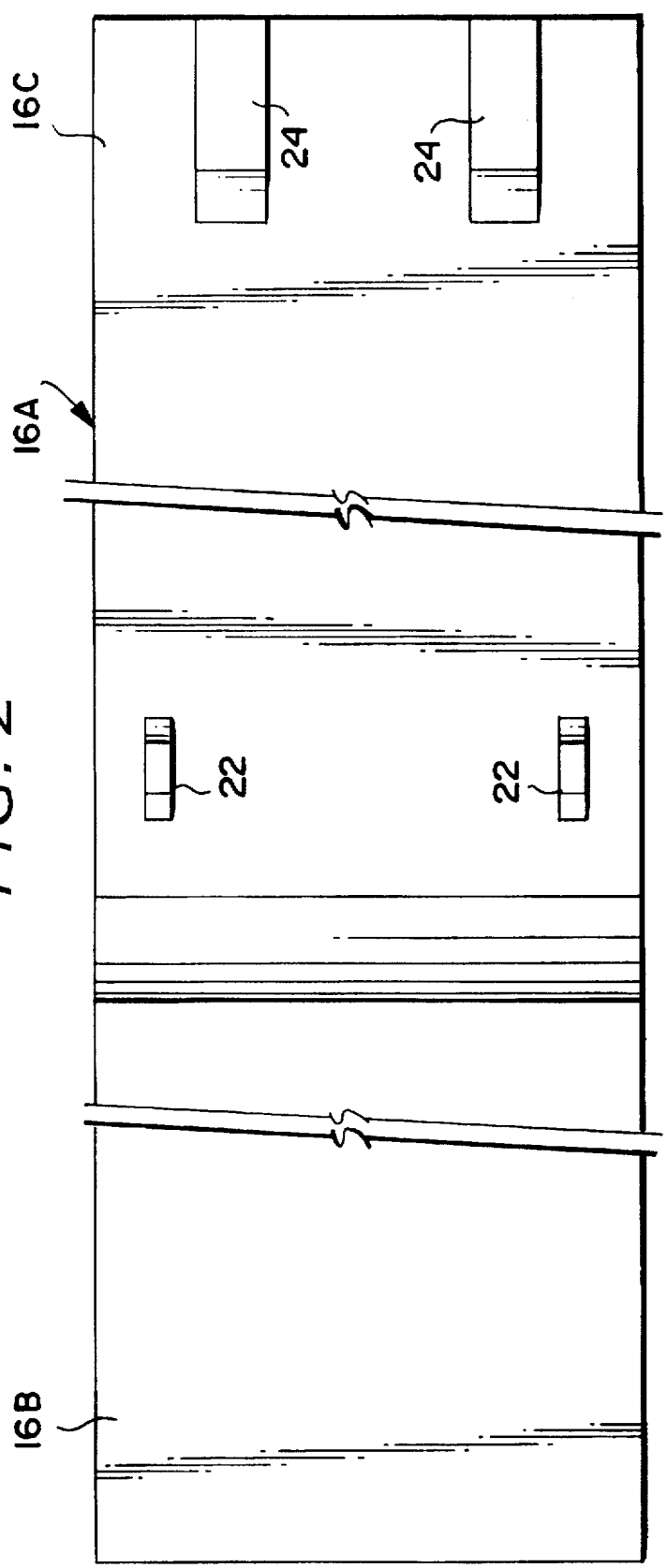

HANDLE ASSEMBLY AND CHANNEL FOR A NUCLEAR REACTOR FUEL BUNDLE ASSEMBLY

TECHNICAL FIELD

This invention relates generally to the structure of a fuel bundle assembly in a boiling water nuclear reactor vessel and, more particularly, to a fuel bundle assembly utilizing a new handle assembly in place of an upper tie plate, and a re-designed channel having an increasing flow volume in an axial direction.

BACKGROUND

A conventional fuel bundle assembly in a boiling water nuclear reactor includes a lower tie plate, an upper tie plate and a matrix of sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A channel surrounds the tie plates, fuel rods and one or more coolant rods. This channel is generally square in cross-section and made of metal (preferably Zircaloy). During reactor operation, coolant water enters through the lower tie plate within the channel and flows upwardly between the upstanding fuel rods. Water and generated steam exit through the upper tie plate. The channel confines the required moderator coolant flow to a flow path that is restricted between the tie plates.

A typical boiling water reactor channel has a constant internal flow area formed by a full length square cross section with rounded corners. Variations of the uniform thickness concept are disclosed in commonly owned U.S. Pat. No. 4,749,543. The patent discloses channel designs which have reduced average thickness in the upper portion of the channels corresponding to a lower pressure difference acting on the channel sides in the upper portion of the channel. In some instances, the axial variation of the channel average thickness increases water volume adjacent the upper part of the channel to provide increased neutron moderation, to minimize the steam void reactivity coefficient, and to provide a greater cold shut-down margin.

Energy addition along the fuel rods converts some of the water to lower density steam. The resultant steam-water flows, referred to as two-phase flows, have velocities that continue to increase upwardly in the fuel bundle as more steam is formed. Thus, if the flow area is maintained constant, much higher pressure drops occur in the upper section of the fuel bundle than in the lower section. Excess pressure drop in the fuel channels can limit the flow and power capability of the fuel.

Further, pressure drop in the two-phase flow region has an adverse effect on stability of plant operation. It is therefore particularly advantageous to increase flow area to reduce pressure drop in the upper section of a BWR fuel bundle. However, techniques for flow area increase must be compatible with both dimensional constraints and thermal performance of the fuel.

The outside dimensions of a fuel channel are highly constrained to assure that it will not affect or interfere with externally adjacent components such as control rods or instrument tubes. Fuel channels, however, are subject to creep bulging due to the pressure differentials that exist across the channel wall. Typically, the pressure differential across the channel wall is largest at the flow entrance and decreases as an approximate cosine function with downstream distance (the differential is zero at the channel exit). Therefore, the channel thickness required to resist creep bulging is also greatest at the flow entrance and decreases with downstream distance. Accordingly, any flow area increases which affect fuel channel wall thicknesses must consider these creep bulge characteristics.

Thermal performance of the fuel is limited by the maximum power for which normal boiling heat transfer can be maintained on all fuel rods. Beyond that power, referred to as the critical power, the heat transfer of one or more fuel rods can deteriorate causing unacceptable temperatures. For effective critical power performance, it is important to maintain good coolant distribution around all of the fuel rods. Since increasing the flow area of a fuel bundle can cause redistribution of the coolant flow, any such increases must therefore also consider potential associated effects on critical power performance.

As already mentioned, the lower tie plate and the upper tie plate serve to support the sealed fuel rods in the vertically oriented matrix, enclosed by the channel. Typically, the upper tie plate forms an overlying matrix of fuel rod support points. Into about eight of these support points (depending on the size of the fuel rod array) are placed male threaded tie rods and fittings. The tie rods, which may contain fuel similar to the fuel rods, are threaded at their lower ends for corresponding attachment to the lower tie plate. The lower tie plate similarly forms an underlying matrix of fuel rod support points, including threaded female apertures for supporting the lower threaded ends of the tie rods. Thus, the fuel rods are supported between the upper and lower tie plates, which in turn, are held together via the threaded tie rods.

As described in detail in co-pending application Ser. No. 08/1542,382, filed Oct. 12, 1995, now U.S. Pat. No. 5,627,866, the upper tie plate 22 and handle assembly 32 can be removed from the bundle assembly so that one or all of the fuel rods and coolant rods can be removed from the channel.

In designing a nuclear fuel bundle assembly, a limiting constraint for very high exposure capabilities is the pressure built up in the fuel rods due to fission gas release. Also, the differential irradiation growth of the fuel rods and water rods becomes more significant at high exposures, requiring very long end plug extensions which are guided laterally by bosses in current upper tie plate designs. These long end plug extensions reduce the length available for the fuel rod plenum used to accommodate the fission gas release. The upper tie plate and upper end plug designs currently used require complex machining, and these components, as well as the expansion springs, are costly.

In co-pending, commonly owned application Ser. No. 08/567,152 filed Dec. 5, 1995, now U.S. Pat. No. 5,610,961 (and incorporated herein by reference), there is disclosed a fuel bundle assembly which eliminates the upper tie plate in favor of only a relatively small handle bar assembly. The handle assembly connects directly to the channel so that lifting loads are borne by the channel itself, eliminating the need for separate tie rods. By eliminating the upper tie plate grid, the fuel rods may be extended in length to a point that adequate clearance with the upper handle of the fuel bundle assembly and the fuel handling equipment is maintained. The upper end plugs may also be shortened to thereby allow for the further extension of the fuel rod plenum length. Elimination of the upper tie plate with its complex grid construction also reduces the flow restriction and pressure drop at the top of the bundle, and provides an opportunity to reduce the overall cost of fuel bundle assembly fabrication. An additional benefit is that some of the fuel rods can be removed from the bundle without having to remove any other structural members from the upper end of the bundle.

Because the upper tie plate grid is eliminated, the other nonstructural fuel and water rods are free at their upper ends. Typically, with the upper tie plate removed, the uppermost (or an additional) spacer is located near the upper ends of the rods to provide lateral support. Very short upper end plugs may now be used, since they function only to seal the upper ends of the fuel rods, and thus, the plenum regions of the fuel rods may be extended.

The fuel bundle assembly having the upper tie plate grid eliminated and including a spacer located near the upper ends of the rods still suffers, however, from a large pressure drop in the two-phase flow region. As noted above, excess pressure drop in the fuel channel can limit the flow and power capability of the fuel, and pressure drop in the two-phase flow region has an adverse effect on stability of plant operation. Still further, because the fuel pellets in the fuel rods extend substantially along the length of the fuel rods to a point, for example, several inches below the fuel rod end plugs, the coolest regions of the fuel rods are generally at or near the end plugs. As a result, hydrogen in the reactor vessel tends to collect at or near the end plugs, which detrimentally embrittles the cladding, thereby making the end plugs susceptible to breakage. In this instance, it is desirable to prevent the end plugs from escaping the fuel bundle and affecting other external components.

DISCLOSURE OF THE INVENTION

It is therefore an object of the present invention to provide an improved fuel bundle assembly of the type where the upper tie plate has been eliminated. Specifically, this invention relates to an improved lifting handle assembly that includes structure for preventing failed end plugs from escaping the fuel bundle.

It is another object of the invention to provide a fuel bundle channel design which exhibits pressure drop improvement over the existing constant-area channel designs, which satisfies dimensional clearance requirements, creep bulge requirements and critical power performance.

In the exemplary embodiment described herein, an axially nonuniform channel is provided to improve pressure drop performance of the BWR fuel bundle. One approach is to vary the outside dimension of the fuel channel along the length of the channel, but maintain a consistent channel wall thickness. This approach can be used in some BWR plants, where external clearance is allowed. Another and more preferred approach is to maintain the external dimensions of the fuel channel and to vary the wall thickness along the length of the channel. This approach can be applied to all BWR plants without regard to external clearances.

In addition, the handle assembly is provided with a grid structure that prevents debris from escaping the fuel bundle assembly. The grid structure may include a plurality of gridwork cross members integrally formed with the handle assembly forming a plurality of gridwork windows, which are preferably sized to prevent a fuel rod end plug from passing therethrough.

Thus, in one aspect, the present invention provides a fuel bundle assembly including a plurality of fuel rods; at least one coolant rod; a fuel bundle assembly channel surrounding the plurality of fuel rods and the coolant rod; and a handle assembly disposed inside the fuel bundle assembly channel and receiving the coolant rod. The handle assembly includes a grid structure that prevents debris from escaping the fuel bundle assembly.

In another aspect, the present invention provides a fuel bundle assembly for a nuclear reactor including an array of fuel rods; a lower tie plate supporting the array of fuel rods at lower ends thereof, but with no corresponding upper tie plate; a lifting handle located above the fuel rods and including a horizontally oriented grid structure; and a channel enclosing the array of fuel rods and extending substantially between the lower tie plate and the lifting handle. The channel has an interior flow volume which increases in an upper section thereof.

BRIEF DESCRIPTION OF THE DRAWINGS

These and other aspects and advantages of the present invention will become apparent from the following detailed description of preferred embodiments when taken in conjunction with the accompanying drawings, in which:

FIG. 2 is a partial plan view of a metal sheet used in the manufacture of a fuel bundle channel;

FIG. 3 is a front elevation of the strip shown in FIG. 2;

BEST MODE FOR CARRYING OUT THE INVENTION

Figure 1:
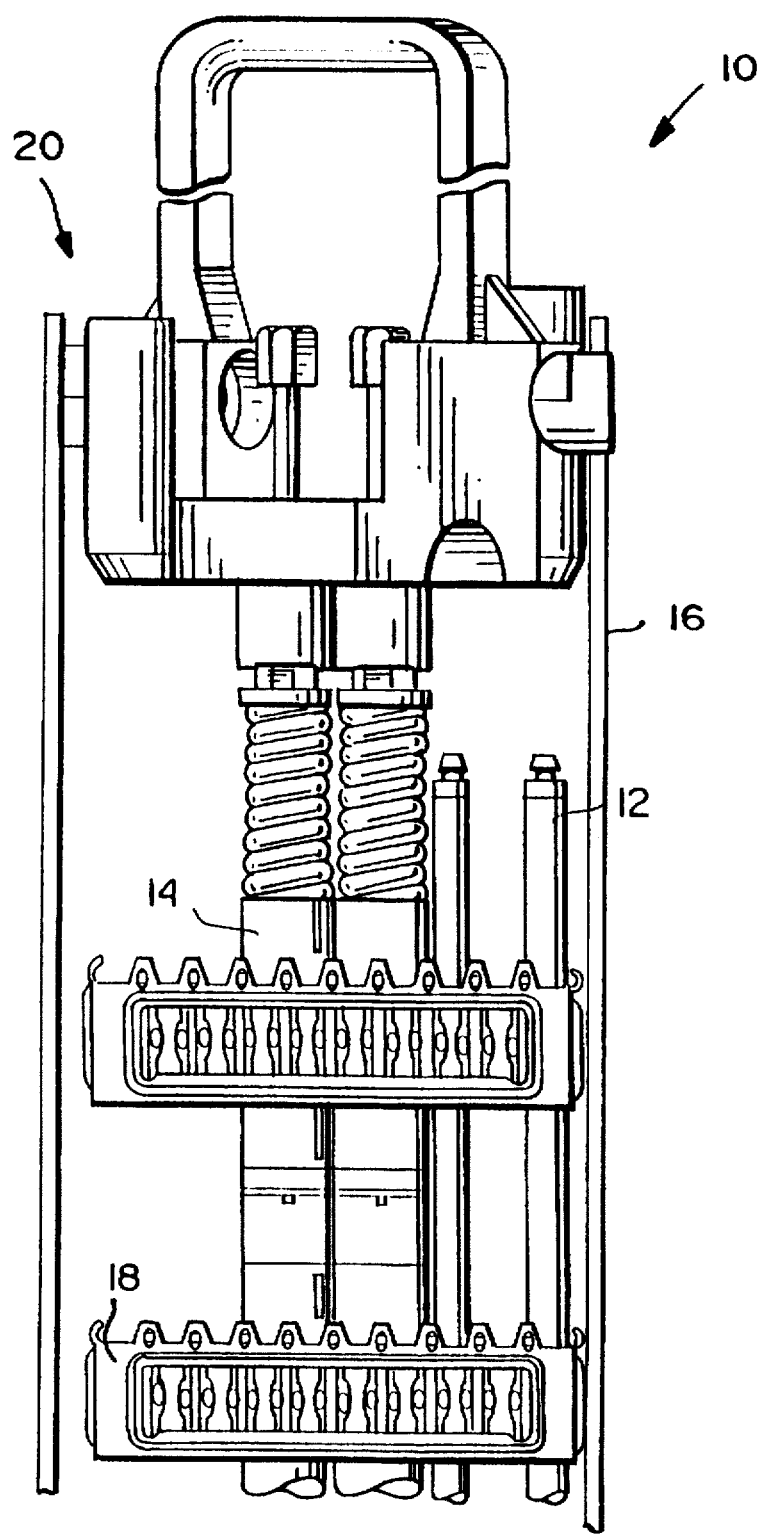
FIG. 1 is a front elevation view of the top portion of a fuel bundle assembly.

FIG. 1 is a front elevation view of a fuel bundle assembly for a boiling water nuclear reactor in accordance with one embodiment of the present invention. The fuel bundle assembly 10 includes a plurality of fuel rods 12, a pair of coolant rods 14 (two coolant rods 14 are illustrated and described in the preferred embodiment, however, a single coolant rod is often used in such fuel assemblies), and a channel 16 surrounding the fuel rods 12 and coolant rods 14. The fuel rods 12 may be arranged in a 10×10 matrix and are secured against lateral movement in the channel by a plurality of spacers 18. The coolant rods 14 are generally centrally disposed in the fuel rod matrix. One of the water rods also serves as the spacer-capture rod, i.e., it mechanically locates each of the spacers 18 axially along the bundle. The fuel rod spacers 18 are equipped with Inconel-X springs to maintain rod to rod spacing and prevent unwanted vibration in the rods.

At the upper end of the fuel bundle assembly 10, the conventional upper tie plate, which would normally receive the upper ends of the fuel rods 12, and rigidly connect to special fuel rods serving as tie rods (also rigidly connected to the lower tie plate) has been eliminated. In its place, there is provided a handle or lifting bar assembly 20, described in greater detail below. With the elimination of the upper tie plate, the conventional fuel rod end plugs can be made shorter in axial length, as shown in FIG. 1, which allows the fuel rod itself to be extended, thus maximizing fuel rod plenum length.

With reference now to FIGS. 2–7, improvements to the bundle assemblies in accordance with this invention are illustrated in greater detail. In FIGS. 2 and 3, a channel strip 16A is illustrated prior to bending into a channel half which is ultimately welded to another, identical channel half to form a complete, substantially square section channel, similar to channel 16. It can be seen that the thickness of the channel strip 16A remains constant throughout the lower section 16B of the channel, extending, for example, from the lower edge of the channel to a location approximately 80 inches from the bottom edge of the channel, or about one half the channel length. At this point, the channel wall thickness tapers from a thickness of, for example, 0.075 inches to a thickness of, for example, 0.055 inches. Thus, the thickness reduction is about 25%, and the change in thickness occurs over an axial distance of about 1–2 inches. The reduced thickness is maintained through the upper section 16C of the channel to the uppermost edge thereof. It should be noted, however, that in this reduced thickness area, raised pads 22, 24 of the original channel wall thickness remain on the inside surface of the channel to hold the fuel rod spacers away from the channel wall. These pads allow a single spacer design to be used while still maintaining a relatively uniform gap around the periphery of the fuel bundle, as required for critical power performance. The pads 22, 24 illustrated in FIGS. 2 and 3 are shown at discrete locations along the channel, but they could also be formed as raised strips along most or all of the expanded section (i.e., reduced thickness section) of the channel to allow spacers to be positioned at arbitrary axial locations.

Figure 4:
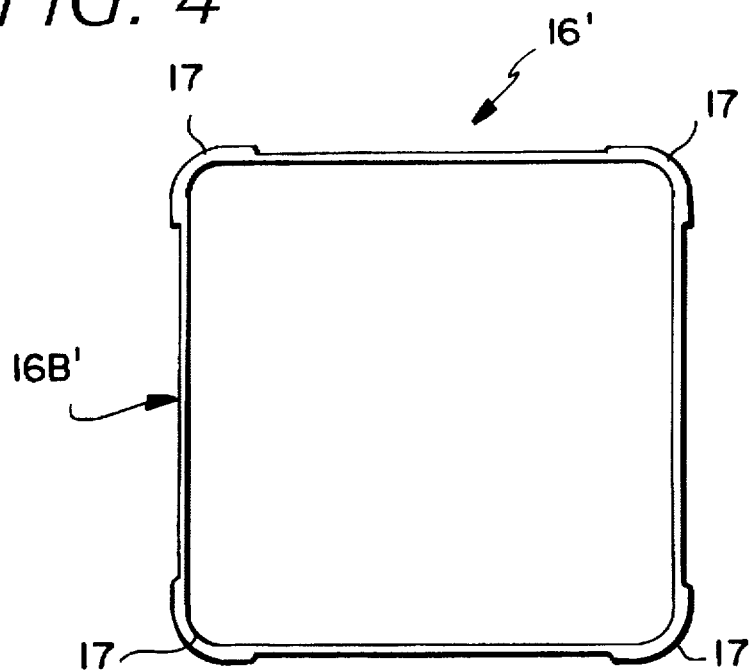
FIG. 4 is a cross-section through a lower end portion of a fuel bundle channel having thickened corners.
Figure 5:
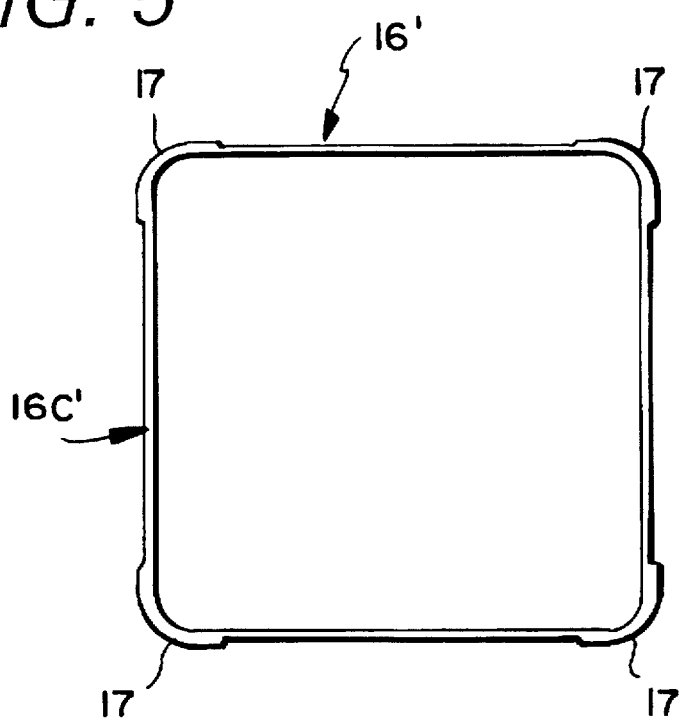
FIG. 5 is a cross-sectional view of an upper portion of the channel shown in FIG. 4, illustrating the reduction in wall thickness therebetween.

The channel profile illustrated in FIGS. 2 and 3 is for a channel without thick corners. With reference now to FIGS. 4 and 5, end views of a channel 16' formed in accordance with this invention are illustrated, but with thickened corners 17 as found on certain channel designs. In FIG. 4, for example, the lower section 16B' of the illustrated channel has a wall thickness between the corners as stated above, i.e., 0.075 inches, while the corners have thicknesses of about 0.120 inches. In the upper section 16C' of the channel as illustrated in FIG. 6, the wall thickness between the corners 17 is also as stated above, i.e., 0.055 inches, while the corners themselves have a reduced thickness of 0.100 inches.

Again, the concept here is to use decreased channel wall thickness in order to increase the inside dimension of the channel in the upper section where the differential pressure across the channel wall is low. The creep bulge (which is proportional to the magnitude of the pressure differential and inversely proportional to a power of the channel thickness) can still be kept smaller than that which occurs in the lower region by judicious choice of the material thickness in the upper section. The larger flow area in the upper section is particularly effective for reducing pressure drop in the boiling two-phase region. The extra flow area in the upper section is specifically located about the periphery of the fuel, i.e., between the fuel rod array and the channel wall, which also results in significantly improved critical power performance.

Figure 6:
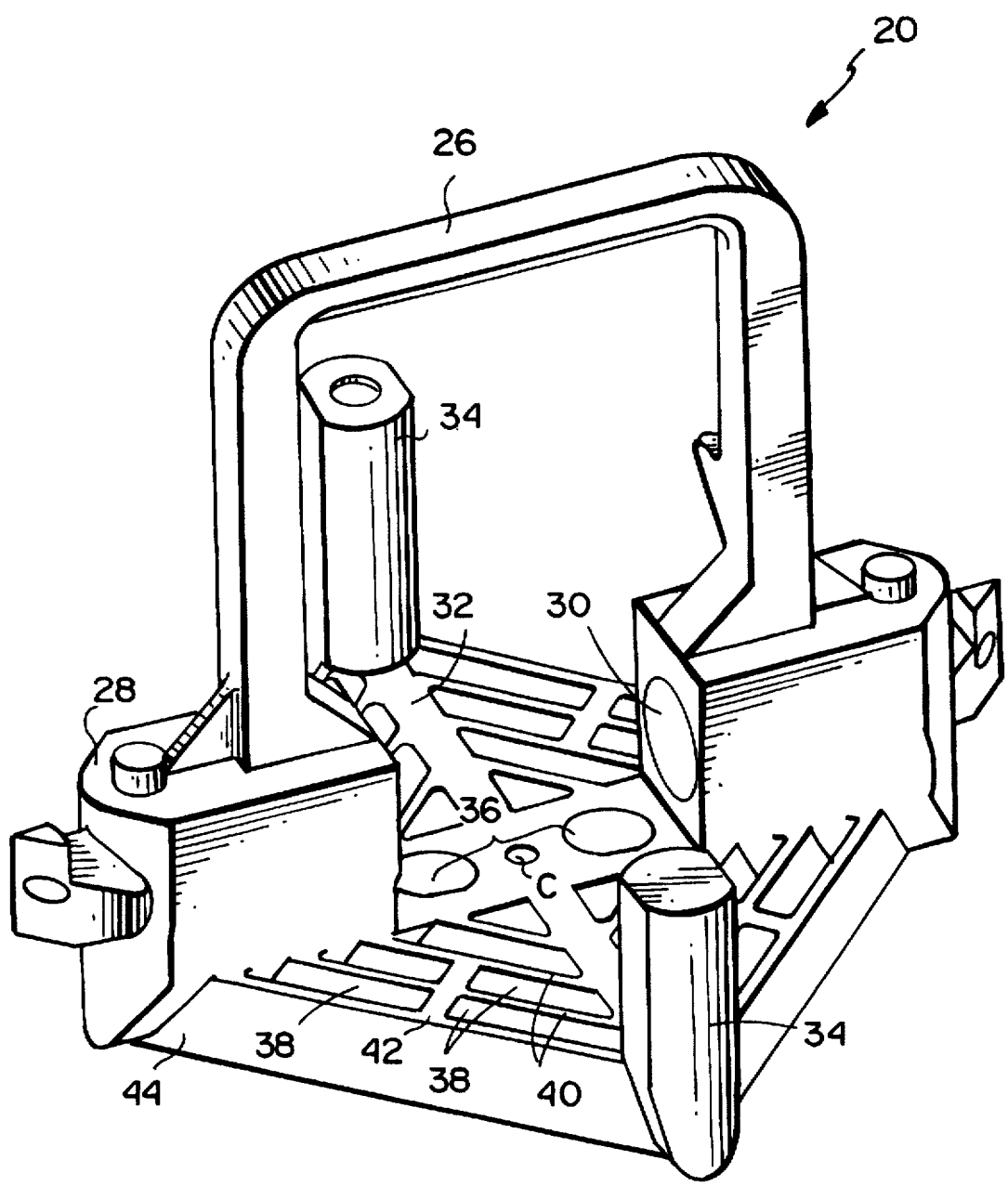
FIG. 6 is a perspective view of a handle assembly according to the invention.
Figure 7:
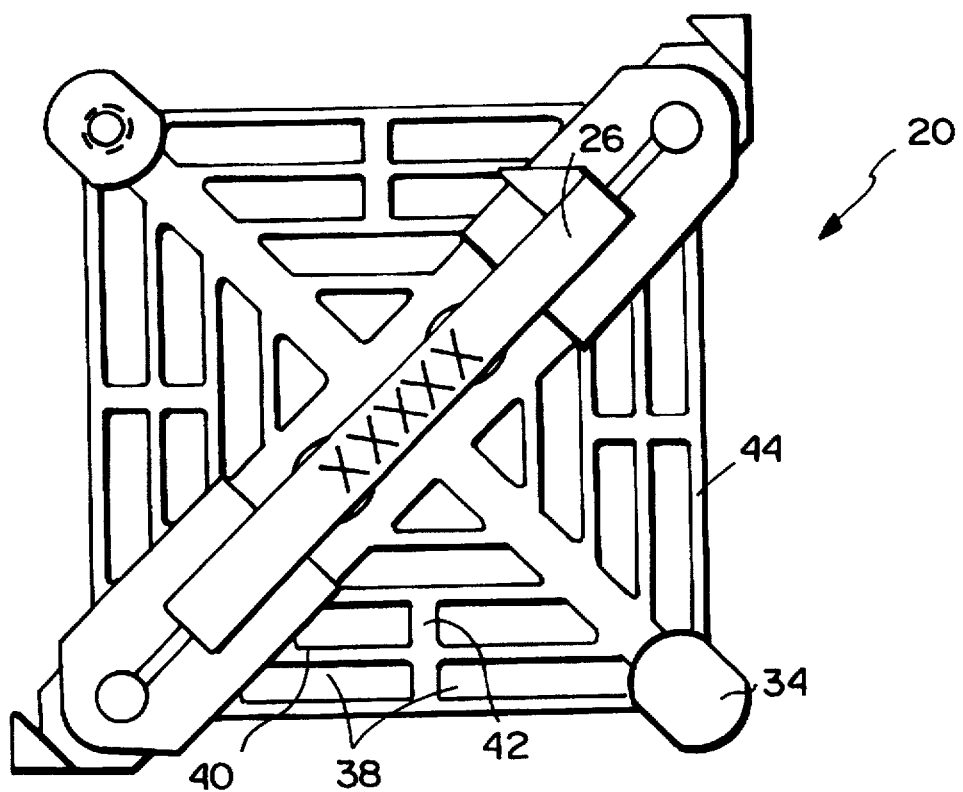
FIG. 7 is a top view of the fuel bundle assembly illustrated in FIG. 6.

FIGS. 6 and 7 illustrate an improved handle assembly according to the present invention. The handle assembly 20 is located above the upper free ends of the fuel rods 12 as shown in FIG. 1. The handle assembly 20 includes a bail handle 26 integral with a pair of boss members 28 having bores 30 therein. A cross member 32 having a pair of outriggers 34 is configured such that it is substantially perpendicular to the bail handle 26. The central plane of the handle assembly 20 is disposed below the plane defined by the longitudinal axis of the bores 30. The coolant rods 12 extend upward through coolant rod receiving holes 36 in the central plane. The bores 30 of the handle assembly 20 are each configured to accommodate a latch pin for selectively engaging the bundle channel 16. Examples of suitable latch pin assemblies are described in the above-noted commonly owned U.S. Pat. No. Ser. No. 5,610,961.

As noted above, because the end plugs are generally disposed at the coolest regions of the fuel rods, the end plugs are particularly susceptible to breakage by hydrogen collecting at the coolest regions of the fuel rods, which serves to detrimentally embrittle the cladding. In the event of such breakage, it is important to prevent the end plugs from escaping the fuel bundle, which may cause damage to other external components.

To obviate this potential problem, the handle assembly 20 according to this embodiment of the invention is provided with structure for preventing debris such as a broken end plug from escaping the fuel bundle. In a preferred arrangement, as shown in FIGS. 6 and 7, the structure includes gridwork integrally formed with the handle assembly components. The gridwork is interconnected between the boss members 28 and the outriggers 34 and defines a plurality of gridwork windows 38 that are sized slightly smaller than the diameter of the fuel rod end plugs so as to prevent their escape in the event of end plug failure. Of course, any gridwork configuration having properly sized gridwork windows would be appropriate in the context of the present invention, and the invention is not meant to be limited to the illustrated gridwork configuration. FIG. 6 is thus an exemplary illustration of one preferred configuration according to the present invention.

In FIG. 6, a plurality of gridwork cross members 40 extend between each boss member 28 and outrigger 34 in parallel and perpendicular relation. An intermediate cross member 42 is disposed substantially centrally between each boss member 28 and outrigger 34. A grid boundary member 44 is disposed about the perimeter of the gridwork, defining a substantially square shape. Of course, other shapes may be contemplated so long as the handle assembly 20 fits inside the channel 16 without any spaces larger than the end plug diameter.

As shown in FIGS. 6 and 7, in a preferred arrangement, the grid boundary member 44 comprises an outermost cross member, and three additional cross members 40 extending between the boss members 28 and outrigger 34 toward the center C of the handle assembly 20. The intermediate cross member 42 substantially bisects the outermost cross member and a next cross member 40, defining four gridwork windows 38. Two additional gridwork windows 38 are defined by the remaining cross members 40. In a preferred arrangement, this configuration is identical in each of the four areas between the boss members 28 and outriggers 34.

The handle assembly illustrated in FIGS. 6 and 7 is preferably formed of stainless steel and is casted as a one-piece (integral) unit. It is preferred that the gridwork cross members 38 are continuous over the entire gridwork (i.e., each gridwork cross member 38 extends completely between each boss member 28 and outrigger 34) to provide additional support for the fuel bundle assembly and to facilitate casting of the handle assembly.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel bundle assembly comprising:
    a plurality of fuel rods;
    at least one coolant rod;
    a fuel bundle assembly channel surrounding said plurality of fuel rods and said coolant rod; and
    a handle assembly disposed inside said fuel bundle assembly channel, said handle assembly receiving said at least one coolant rod, and said handle assembly comprising a grid structure, wherein said grid structure comprises a plurality of gridwork windows sized to prevent a fuel rod end plug from passing therethrough.

2. A fuel bundle assembly according to claim 1, wherein the grid structure comprises a plurality of gridwork cross members integrally formed with said handle assembly forming said grid structure.

3. A fuel bundle assembly according to claim 2, further comprising a plurality of intermediate cross members disposed substantially perpendicular to said gridwork cross members, said gridwork cross members and said intermediate cross members forming said plurality of gridwork windows.

4. A fuel bundle assembly according to claim 1, wherein said grid structure comprises a plurality of gridwork cross members disposed in parallel and perpendicular relation forming a substantially square grid structure.

5. A fuel bundle assembly according to claim 4, wherein said gridwork cross members are integral with said handle assembly.

6. A fuel bundle assembly according to claim 1, wherein said fuel bundle assembly channel has an interior flow volume which increases in a direction from bottom to top.

7. A fuel bundle assembly according to claim 1, wherein average wall thickness in an upper portion of said fuel bundle assembly channel is less than in a lower portion of the channel.

8. A fuel bundle assembly according to claim 7, wherein a wall thickness change separating said upper portion from said lower portion occurs about midway between upper and lower edges of said fuel bundle assembly channel.

9. A fuel bundle assembly according to claim 7, wherein spacer retaining tabs are provided in said upper portion, and wherein the thickness of said tabs is substantially equal to the channel wall thickness in said lower portion.

10. A fuel bundle assembly according to claim 8, wherein said wall thickness in said upper portion is about 25% less than in said lower portion.

11. A handle assembly for a fuel bundle in a nuclear reactor vessel, the handle assembly comprising a grid structure, wherein said grid structure comprises a plurality of gridwork windows sized to prevent a fuel rod end plug from passing therethrough.

12. A handle assembly according to claim 11, wherein said grid structure comprises a plurality of gridwork cross members integrally formed with said handle assembly forming said grid structure.

13. A handle assembly according to claim 12, further comprising a plurality of intermediate cross members disposed substantially perpendicular to said gridwork cross members, said gridwork cross members and said intermediate cross members forming said plurality of gridwork windows.

14. A handle assembly according to claim 11, wherein said grid structure comprises a plurality of gridwork cross members disposed in parallel and perpendicular relation forming a substantially square grid structure.

15. A handle assembly according to claim 14, wherein said gridwork cross members are integral with said handle assembly.

* * * * *